Patented Feb. 4, 1936

2,029,830

UNITED STATES PATENT OFFICE 2,029,830

PREPARATION OF DYESTUFFS OF THE TRIPHENYLMETHANE SERIES AND RELATED SUBSTANCES

Avery A. Morton, Watertown, and Joseph R. Stevens, Cambridge, Mass.

No Drawing. Application March 12, 1931, Serial No. 522,180

7 Claims. (Cl. 260—67).

This invention concerns the preparation of dye stuffs and related substances.

More particularly, it constitutes an improvement on the known methods of preparing dyes, of which malachite green, crystal violet and related dyes are illustrations; usually, but not necessarily, dyes of the triphenylmethane series. It provides a simple and inexpensive method by which such substances may be made.

In the prior art, malachite green has been prepared by interacting benzaldehyde and dimethylaniline, subsequently oxidizing the leuco base so formed; crystal violet, by combining Michler's ketone (a tetramethyldiaminodiarylketone) with dimethylaniline in the presence of phosphorus oxychloride. A more recent method of preparing dyes of the triphenylmethane series is to permit parachlortoluene and other aryl halides to react with Michler's ketone in equimolar quantities in the presence of sodium.

All of these methods have their disadvantages, because of the expense of the ingredients employed and/or the difficulty in carrying out the reaction. Michler's ketone, for example, is so high in price as to limit its use on a commercial scale. For a considerable period of time, efforts have been made to simplify and reduce the cost of preparing the dye stuffs with which this invention deals. The present invention, employing a relatively simple neutral compound containing a carbonyl group in place of the complicated basic reagents heretofore used, overcomes these and various other objections which can be raised to the methods of the prior art.

We have found that we can make use of a hitherto unknown reaction to condense the halides of certain N-di-substituted amino aryl compounds with compounds containing the carbonyl group, usually in the ratio of two or more mols of the halide to one of the neutral carbonyl compound. Briefly stated, we introduce the di-substituted amino group into the final product by first making a halide derivative and then, in the presence of alkali metal, reacting such derivative with a compound incapable of forming a dye stuff by itself, but containing the carbonyl group. The resulting product usually has the properties of a dye base; that is to say, by simple and known methods, it can be converted into a dye.

By N-di-substituted amino aryl compounds we mean amino aryl compounds in which the two hydrogen atoms of the amino group are substituted by two radicals from the class consisting of alkyl and aryl hydrocarbon radicals, and for this purpose the selection may be two alkyl or two aryl, or an alkyl and an aryl hydrocarbon radical.

By way of example, we prepare crystal violet in accordance with our invention by placing three parts of sodium in one hundred parts of dry benzene, to which there is added a mixture of three parts diethylcarbonate and ten parts of parabromdimethylaniline. The whole is preferably heated in a refluxing apparatus until all of the sodium has reacted, but may instead be allowed to stand in a closed container for such time as is necessary for all of the sodium to react.

After the sodium has disappeared, the mixture is decomposed by the addition of water and the benzene is evaporated. The solid residue is filtered off and converted to the dye by treatment with dilute hydrochloric acid in the manner currently employed when dyes are made by the present method. A yield of more than thirty per cent is easily obtained by the practice of the present invention.

The preparation of malachite green may be carried out in an exactly similar way except that four parts of ethylbenzoate are employed instead of the diethylcarbonate. In the preparation of malachite green, the reaction which we have discovered proceeds on the basis of two mols of the halide to one of the carbonyl compound, whereas in our method of preparing crystal violet the ratio is three to one.

Our process thus differs from the prior art not only in its employment of carbonyl compounds, but also in that the mol. ratio of the reagents is usually two or more of the halide to one of the carbonyl. This is a distinct advantage in the case of expensive carbonyls for the reason that less of the carbonyl is necessary. In the prior art, Michler's ketone has been required for the preparation of crystal violet. In our process, an ester or an acid chloride is used, which makes for simplicity.

In place of the bromine compound, there may be used other halides such as the iodide and the chloride, the latter with obvious economic advantages. Other di-substituted amino aryl compounds containing halogens may also be employed, among them being the halides of diethylaniline, dimethylaminonaphthalene, dimethylaminodiphenyl, methylbenzylaniline, methyldiphenylamine and the like. Different dyestuffs will of course be obtained from these substances.

Other compounds containing the carbonyl group, all of which are suitable in place of the diethylcarbonate, are diethyloxalate, ethylbenzoate, diethyl phthalate, phthalic anhydride, phosgene, benzoyl chloride, chlorethyl formate, quinone, anthraquinone, xanthone and like compounds. Xanthone and anthraquinone react with parabromdimethylaniline to form strongly fluorescent substances which, although not usually classified as true dyes, are closely related to them. It is obvious that in the case of the esters above named, the methyl or other ester may be used in place of the ethyl. In general, compounds containing a carbonyl group of the class of esters, acid chlorides, anhydrides, and ketones may be used.

Alkali metals which may be used in the reaction are sodium, lithium and potassium. A wide range of solvents is possible, among which may be mentioned diphenyl, naphthalene, benzene, toluene, xylene, ligroin and anhydrous ether. Where the reaction in any given case is one which proceeds slowly at best, the use of the higher boiling solvents should be considered.

These are but illustrations of the variety and scope of the method of preparation which may be employed in accordance with the invention herein set forth. The malachite green and crystal violet are used as illustrations for the reason that they are commercially practicable dyes, but many other substances can be similarly prepared. The preparation of these compounds may by our process be effected at very substantial reductions in cost. It seems likely that this method of preparation will permit the commercial use of many other dyes of the triphenylmethane series, and other series also, which, because of the expense or impossibility of their preparation, are at present not used commercially.

Obviously, variations in the process or processes of the invention may be made without departing from the spirit thereof and we therefore desire that only such limitations may be placed on the accompanying claims as are imposed by the prior art. It is intended that the patent shall cover, by suitable expression in the appended claims, whatever features of patentable novelty are herein disclosed.

We claim:

1. The condensation in the presence of an alkali metal of a compound containing a carbonyl group of the class of esters, acid chloride, anhydrides, quinones and ketones with a halide of a tertiary aryl amine which is N-di-substituted by two radicals from the class consisting of alkyl and aryl hydrocarbon radicals.

2. A method of preparing dye stuffs which comprises interacting in the presence of an alkli metal a carbonyl compound of the class of esters, acid chlorides, anhydrides, quinones and ketones and the para halogen derivative of an N-di-substituted aniline in which the substituents are radicals from the class consisting of alkyl and aryl hydrocarbon radicals.

3. A method of preparing dyestuffs which comprises reacting in the presence of an alkli metal a compound of the class of esters, acid chlorides, anhydrides, quinones and ketones containing the carbonyl group and the para halide of an N-dimethylated aniline.

4. A method of preparing dye stuffs which comprises interacting in the presence of an alkli metal a compound of the class of esters, acid chlorides, anhydrides, quinones and ketones containing a carbonyl group with the para halide of an N-di-substituted aryl amine, said carbonyl and said aryl amine combining in the ratio of one of the former to a plurality of the latter, the substituents being radicals from the class consisting of alkyl and aryl hydrocarbon.

5. A method of preparing dye stuffs which comprises reacting in the presence of an alkli metal the para halide of an N-di-substituted aryl amine with a carbonyl group consisting of ester and acid chloride compounds, the substituents being radicals from the class consisting of alkyl and aryl hydrocarbon radicals.

6. A method of preparing dye stuffs which comprises reacting in the presence of an alkali metal the para halide of an N-di-substituted aryl amine with a material selected from a group of compounds containing each a carbonyl group, said group of compounds consisting of esters, acid chlorides, anhydrides, ketones and quinones.

7. The condensation, in the presence of an alkali metal, of a compound of the class of esters, acid chlorides, anhydrides, quinones and ketones containing a carbonyl group with a halide of a tertiary aryl amine which is N-di-substituted, by two radicals from the class consisting of alkyl and aryl hydrocarbon radicals.

AVERY A. MORTON.
JOSEPH R. STEVENS.